United States Patent [19]
Nelson

[11] 3,907,038
[45] Sept. 23, 1975

[54] SELF-PROPELLED SOIL STABILIZER MACHINE

[75] Inventor: Albert W. Nelson, Springfield, Ohio

[73] Assignee: Koehring Company, Milwaukee, Wis.

[22] Filed: June 27, 1974

[21] Appl. No.: 483,885

Related U.S. Application Data

[62] Division of Ser. No. 398,315, Sept. 18, 1973, Pat. No. 3,865,175, which is a division of Ser. No. 269,228, July 5, 1972, Pat. No. 3,795,279.

[52] U.S. Cl. ...................... 172/9; 172/12; 172/112
[51] Int. Cl.² ...................................... A01B 63/112
[58] Field of Search ................ 172/2, 3, 7, 9, 12, 4, 172/112, 239

[56] References Cited
UNITED STATES PATENTS

| | | | |
|---|---|---|---|
| 3,190,362 | 6/1965 | Allgaier et al. | 172/2 |
| 3,313,354 | 4/1967 | Jin | 172/12 |
| 3,633,679 | 1/1972 | Dahlberg et al. | 172/7 X |
| 3,684,029 | 8/1972 | Clover | 172/239 |
| 3,746,101 | 7/1973 | Takata | 172/112 |

*Primary Examiner*—Stephen C. Pellegrino
*Attorney, Agent, or Firm*—Andrew J. Beck

[57] ABSTRACT

A self-propelled soil stabilizer machine employs a heavy-duty single horizontal rotor for pulverizing and mixing soil it passes over. The rotor is driven by hydraulic motors which are mounted at the rotor ends and operated by a hydraulic pump (engine driven) which is hydraulically coupled to a hydraulic traction pump (also engine driven) which propels the machine. Overloads on the rotor system are automatically sensed by a closed-loop hydrostatic system and result in a direction in the speed of machine travel until the load on the rotor diminishes. A hydraulic rotary servo-valve and mechanical feed back system automatically controls the rotor to maintain it at a preset depth and provides a visual read-out of depth.

7 Claims, 13 Drawing Figures

SELF-PROPELLED SOIL STABILIZER MACHINE

REFERENCE TO RELATED CO-PENDING APPLICATIONS

This is a divisional application from United States Ser. No. 398,315, filed Sept. 18, 1973, now U.S Pat. No. 3,865,175, which in turn is a divisional application from United States Ser. No. 269,228, filed July 5, 1972 which issued as U.S. Pat. No. 3,795,279 on Mar. 5, 1974.

BACKGROUND OF THE INVENTION

1. Field of Use

This invention relates generally to self-propelled soil stabilizer machines which employ a horizontal rotor for pulverizing and mixing soil and other materials it passes over. In particular, the invention relates to improved hydraulic motor means for driving the rotor, improved means for sensing load conditions on the rotor and for effecting changes in the speed of machine travel in response thereto, and improved means for maintaining and automatically returning the rotor to a preset depth.

2. Description of the Prior Art

Some self-propelled diesel-powered pneumatic-tired soil stabilizer machines employ a single heavy-duty horizontal rotor for pulverizing and mixing native and pre-scarified in-place soils or other materials (with or without additives) to stabilize and achieve a strong homogeneous base for road construction and similar work. Heretofore, the rotor was driven from a power source on the machine through a drive mechanism which typically included components such as an engine power take-off, a drive shaft, gear boxes, transmissions, differentials, clutches, jack axle shafts, sprockets and chain drives, stub shafts at each end of the rotor, and mechanical shear pins for overload protection. In such systems rotor speeds were usually fixed and dependent on engine speed. Overload and shock load conditions imposed on the rotor by submerged rocks, concrete blocks or the like resulted in breakage of the shear pins necessitating pin replacement or, sometimes, failure of one of the drive mechanism components. This resulted in machine damage and costly down-time. Furthermore, prior art machines of this type usually had either of two basic types of means for controlling the depth of rotor cut. One type, called a depth block or floating system type, depended on the position of the mixing box that is pulled and slides along the surface of the soil being processed. At each end of the rotor was a housing enclosing the chain drive to the top of which was attached a vertical bar. The bars contained several holes for pinning depth blocks in place. The blocks thus located would not allow the rotor to go below that position. The position of the rotor was controlled by a single acting hydraulic cylinder. The other type, known as an automatic electric type depth control system, used a cam, limit switches, and solenoid valves to control the rotor position. This latter type received electrical signals from the cam actuated limit switches to correct for or return the rotor to a set depth position. The cam was connected to the lifting arms that raise or lower the rotating drum. In both of the above systems the mechanism and rotor depth position indication means was located to the rear of the operator's station on the machine. The depth block system did not provide for consistent depth control since the rotor could float up and over hard areas. The electrical control system was subject to premature failure due to vibration and extremes of wet and dusty conditions.

SUMMARY OF THE PRESENT INVENTION

In accordance with the present invention there is provided an improved self-propelled engine powered soil stabilizer machine employing a single heavy-duty horizontal rotor.

The machine employs an internal combustion engine for driving a traction pump which supplies hydraulic operating fluid to the hydraulic motors which drive the vehicle's traction wheels. The engine also drives a hydrostatic pump which supplies hydraulic operating fluid to low speed, high torque hydraulic motors which drive the rotor and are mounted directly at either or both ends of the rotor. The speeds of the hydraulic motors for the traction wheels and the speeds of the hydraulic motors for the rotor are manually controllable independently of each other. Preferably, the rotor speed is infinitely variable through at least two operating speed ranges.

In accordance with one aspect of the invention, hydraulic control means of a closed-loop type are provided to enable the traction pump to sense the load imposed on the hydrostatic pump by loads imposed on the rotor and to automatically change or regulate the traverse speed of the machine in response thereto, independently of the setting of the manual controls. The hydraulic control means further comprise a pressure relief valve to relieve pressure surges resulting from heavy shock loads on the rotor.

In accordance with another aspect of the invention, mechanical-hydraulic means are provided which enable the rotor to be set for a predetermined depth, which reposition the rotor at such depth after any displacement therefrom, and which provide a direct visual readout at the operator's console of any vertical displacement of the rotor.

A soil stabilizer machine in accordance with the invention is more versatile than prior art machines; obtains maximum efficiency from the engine in that maximum vehicle forward speed is maintained without stalling; is less subject to shock, overload, stalling and premature component damage; performs in a more uniform and consistent manner; employs fewer critical components and is simpler in design; and is easier and safer to operate than prior art machines.

Other objects and advantages of the invention will hereinafter appear.

THE DRAWINGS

DESCRIPTION OF A PREFERRED EMBODIMENT

Figure 1:
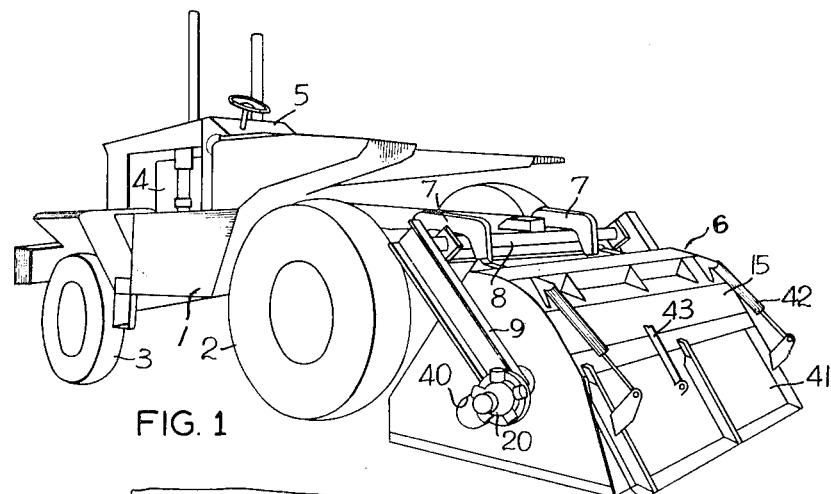
FIG. 1 is an isometric view of the side and rear of a soil stabilizer machine in accordance with the invention.

FIG. 1 shows a self-propelled soil stabilizer machine in accordance with the invention. The machine comprises a main frame or chassis 1 having two rubber-tired rear traction wheels 2 and two rubber-tired steerable front wheels 3. An internal combustion engine 4, such as a diesel engine, and an operator's control console 5 are mounted on chassis 1. A soil stabilizer unit 6 is located at the rear of chassis 1 and is connected thereto by a drawbar 7.

Figure 3:
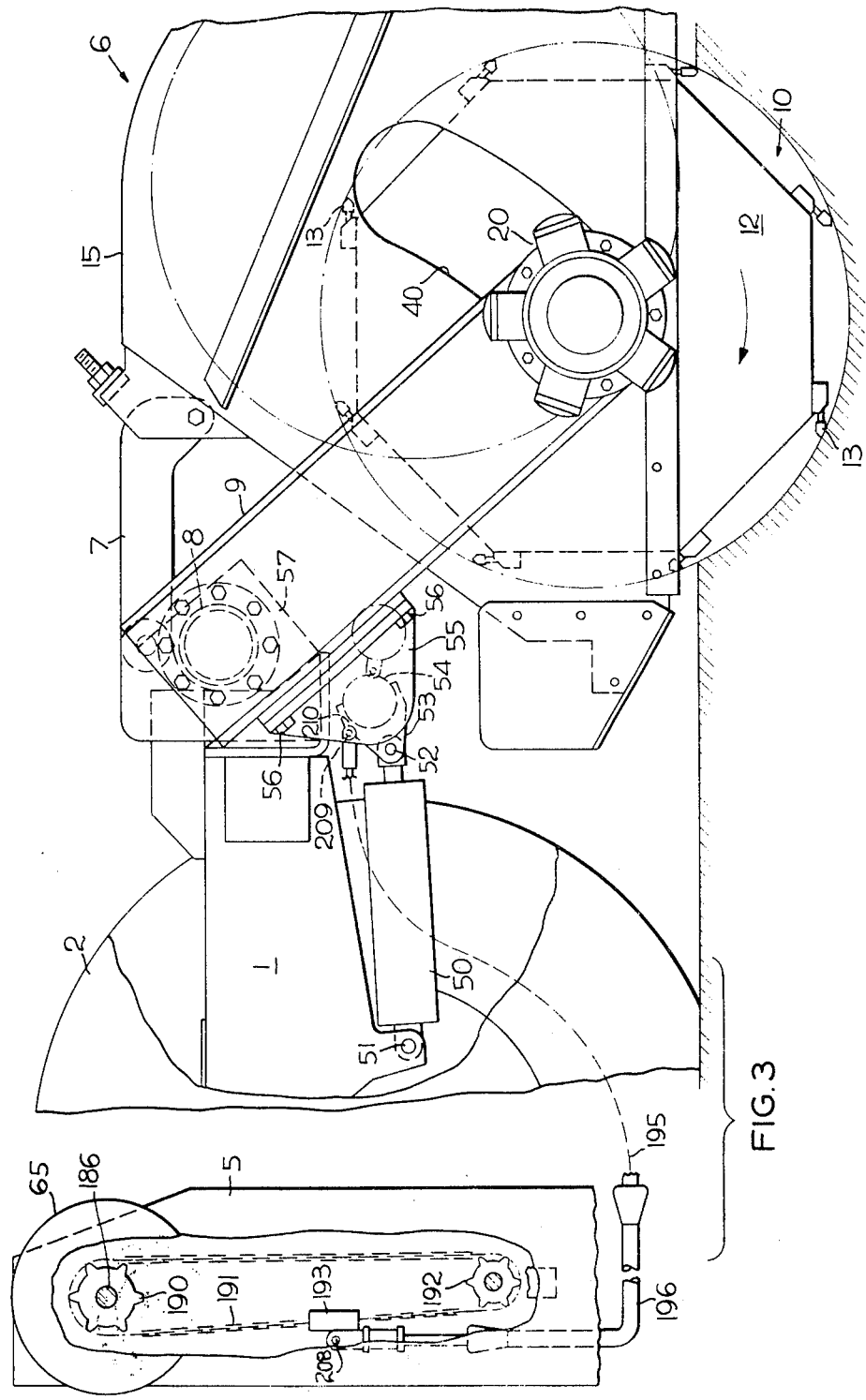
FIG. 3 is an enlarged side view of the stabilizer unit shown in FIG. 1 with the rotor shown digging into the soil.
Figure 4:
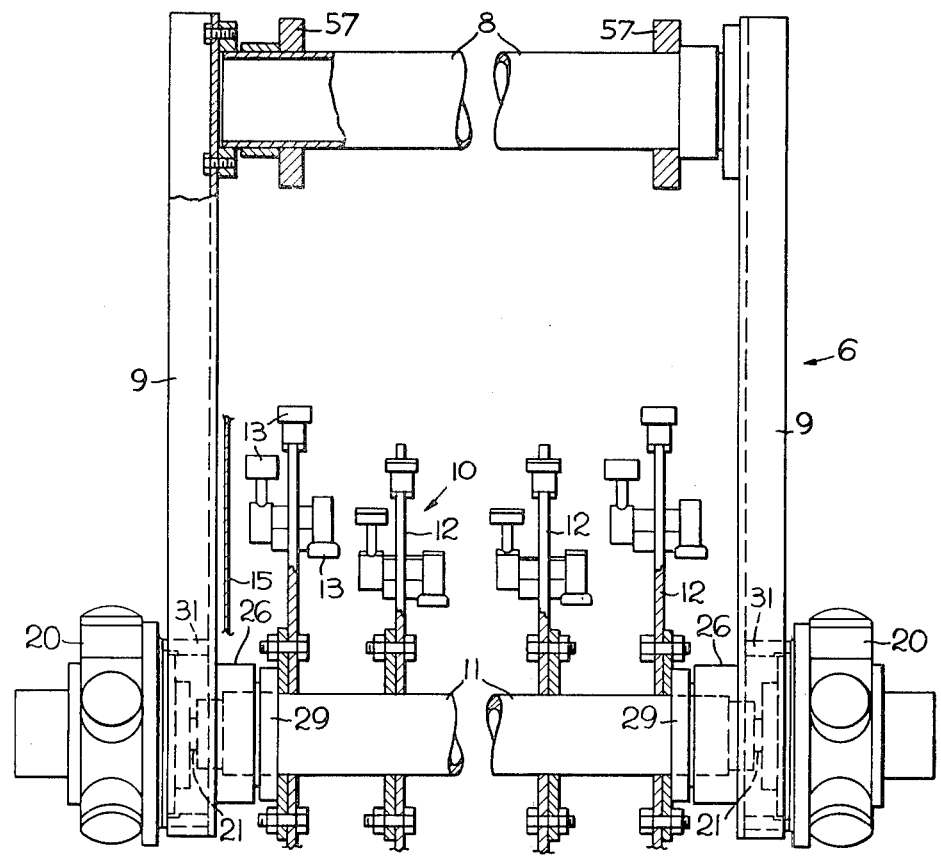
FIG. 4 is a top plan view of the stabilizer unit shown in FIG. 3.

Referring to FIGS. 1, 3 and 4, stabilizer unit 6 comprises a horizontally disposed cross-tube 8 which is rigidly connected to a pair of spaced apart rearwardly extending lifting arms 9 between which a horizontally disposed rotatable rotor 10 is mounted. Cross tube 8 is supported for rotation on supports 57 which are secured to chassis 1.

Figure 5:
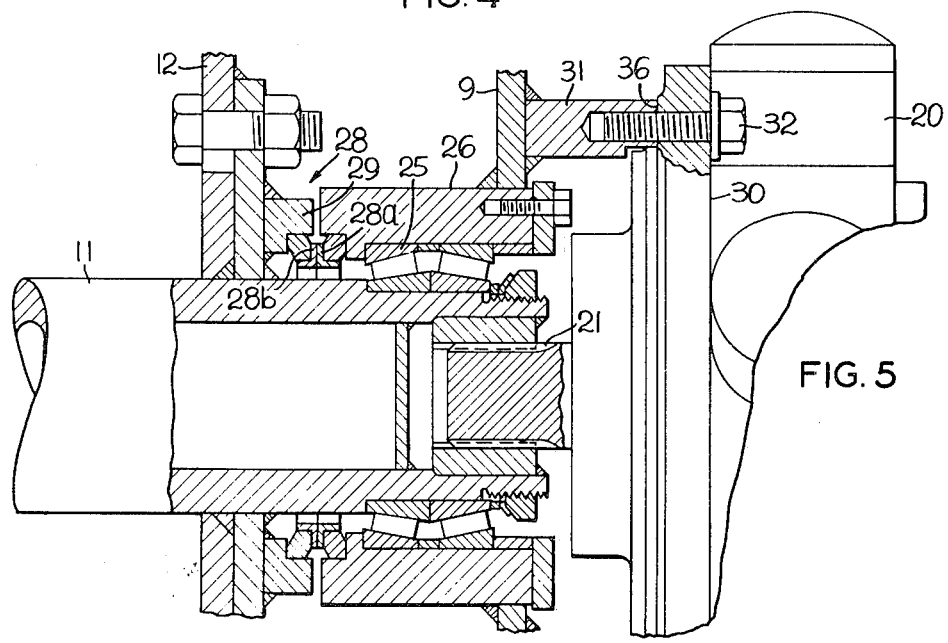
FIG. 5 is an enlarged cross sectional view of a portion of the rotor of the stabilizer unit and a hydraulic motor at one end thereof.

Rotor 10 comprises a shaft 11 on which a plurality of tine plates 12 are rigidly mounted and each tine plate is provided with a plurality of replaceable tines 13. Rotor 10 is adapted to be rotated (clockwise with respect to FIG. 3) by low speed, high torque hydraulic motors 20 of which are rigidly mounted on the lifting arms 9 and have their shafts 21 connected directly to the ends of the shaft 11 of rotor 10, as FIGS. 4 and 5 show. As FIG. 5 shows, each end of rotor shaft 11 is hollow and extends into a roller bearing 25. Each bearing 25 is mounted in a cylindrical bearing housing 26 which is secured to a lift arm 9 by welding. A metal face-type seal 28, including a stationary ring 28a and a movable ring 28b is mounted at the inner end of bearing housing 26. Stationary ring 28a is secured to stationary bearing housing 26 and movable ring 28b is secured to a ring 29 secured to and rotatable with rotor shaft 11. Drive motor 20 comprises a housing 30 which is rigidly but releasably attached to brackets 31 on lifting arm 9 by bolts 32. The rotary drive shaft 21 of motor 20 extends into the hollow end of rotor shaft 11 and is spline-connected thereto to effect rotary motion thereof. A face-to-face bearing seal at 36 is also provided on the exterior sides of bearing 25. Mounting of the motors 20 in the aforesaid manner enables them to be subjected only to torque loads. Furthermore, the bearings 25 and the splines are totally enclosed and operate in oil thereby prolonging service life and enabling rapid removal and replacement of each motor, if necessary. The only connections to the motors 20 are the hydraulic lines and valves (shown in FIG. 6) necessary to transmit drive fluid to the motors. As FIGS. 1, 3 and 4 show, the motors 20 are located on the exterior sides of, but are not connected to, the stabilizer hood 15 and are replaceable without disturbing the hood.

A mixing box or rotor hood 15 is supported on drawbar 7 and surrounds rotor 10 to contain the soil disposed by the rotor. Hood 15 contains clearance slots 40 in its side to afford clearance for rotor 10. Hood 15 is provided with a tail gate 41, positionable by a hydraulic cylinder 42 to give an even strike-off to soil processed by rotor 10. The position of tail gate 41 is indicated by a movable arm 43.

Rotor 10 can be raised or lowered by a pair of hydraulic actuators 50 which are connected at one end to chassis 1 by pins 51 and have their piston rods connected by pins 52 to bracket 53 rigidly mounted on a tube 54. Tube 54 is rigidly secured between a pair of plates 55 which are secured to the lift arms 9 by bolts 56.

Figure 2:
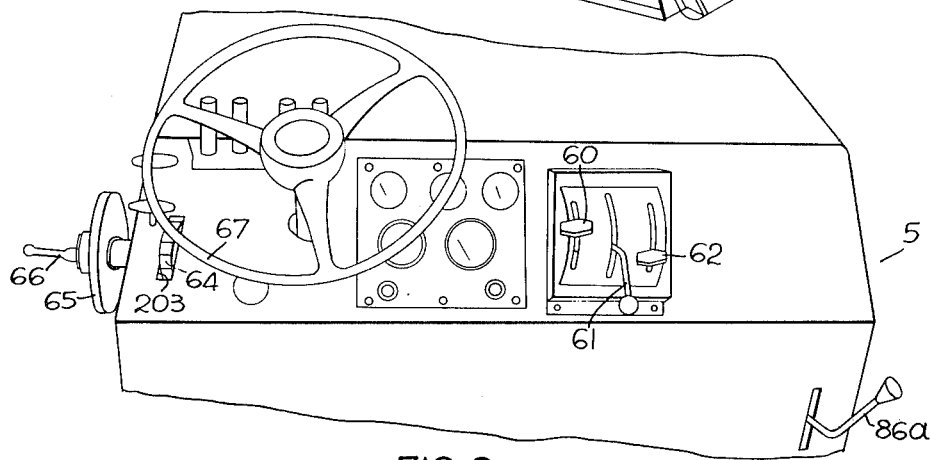
FIG. 2 is an isometric view of the operator's control console for the machine shown in FIG. 1.

FIG. 2 is a view of the operator's control station or console 5 on chassis 1 and shows hydrostatic control levers 60 and 61 hereinafter described, an engine throttle 62, a rotor depth indicating disc 64, a manually operable rotor depth positioning wheel 65 and its cam lock 66 and the vehicle steering wheel 67.

Figure 6:
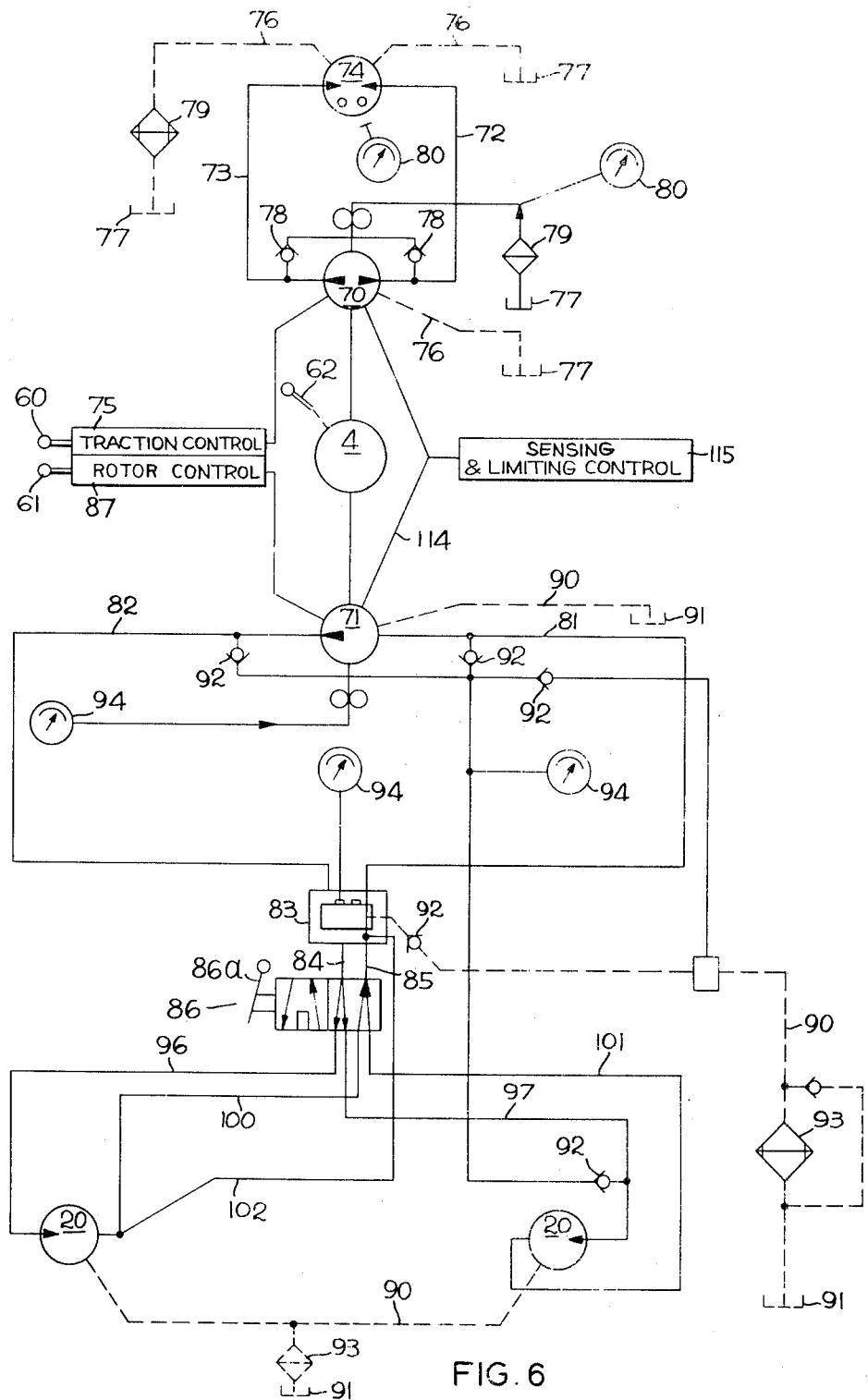
FIG. 6 is a schematic diagram of the hydraulic system for driving the traction wheels and the rotor of the machine shown in FIG. 1.

FIG. 6 is a schematic diagram of a closed loop hydrostatic or hydraulic rotor and traction drive system for the machine shown in FIG. 1 and in accordance with the invention. The system comprises the engine 4 which is mounted on chassis 1 and adapted to drive a hydrostatic traction pump 70 and a hydrostatic pump 71, both of which are also mounted on chassis 1.

Traction pump 70, which is understood to comprise a servocontrol including an adjustable cam and swash plate is connected by hydraulic fluid lines 72 and 73 to a hydrostatic traction fixed displacement motor 74 which is mounted on chassis 1 and furnishes driving power to the driven traction wheels 2. The direction and speed of travel of the machine is controlled by a manually operable control 75, having a control lever 60 that operates a control lever on hydraulic pump 70 to vary the hydraulic fliud output of pump 70 which, as FIG. 2 shows, is located at the machine operator's console 5. Pump 70 and motor 74 are provided with suitable conventional drain lines 76, reservoirs 77, check valves 78, filters 79 and pressure indicating guages 80.

Hydrostatic pump 71 is connected by hydraulic fluid lines 81 and 82 to a cross-over relief valve 83 and the latter is connected by hydraulic fluid lines 84 and 85 to a manually operable series-parallel two-speed rotor speed range selection valve 86 having a control lever 86a for controlling the speed range of the low-speed high torque motors 20 which are mounted on the stabilizer unit 6. Operation of hydrostatic pump 71 (and thus rotation of rotor 10) is controlled by a manually operable control 87 having a control lever 61 located at the machine operator's console 5. Pump 71 and the motors 20 are provided with suitable conventional drain lines 90, reservoirs 91, check valves 92, filters 93 and pressure indicating guages 94.

When speed range selection valve 86 is in the position shown in FIG. 6, the rotor motors 20 are connected in parallel for operation in the zero to 150 RPM speed range. In this configuration, and assuming that manual control valve 87 is actuated to open position, pressurized fluid is supplied from hydrostatic pump 71, through lines 82 and 84 to speed range selection valve 86. From the latter valve, fluid is supplied through the lines 96 and 97 to the motors 20. From the motors 20 fluid returns through the lines 100 and 101, through speed range selection valve 86, through lines 85 and 81 to hydrostatic pump 71.

When speed range selection valve 86 is in its other position, the rotor motors 20 are connected in series for operation in the zero to 225 RPM speed range. In such configuration and assuming that manual control valve 87 is actuated to open position, pressurized fluid is supplied from hydrostatic pump 71, through lines 82 and 84 to speed range selection valve 86. From the latter valve fluid is supplied through the line 96 to motor 20, through lines 100 and 97 to the other motor 20 (on the right in FIG. 6). From the second motor 20 fluid is returned through the lines 101 and 81 to pump 71. Fluid return line 102 is provided to allow for differences in displacement of the two motors which are connected to the same shaft 11.

Figure 12:
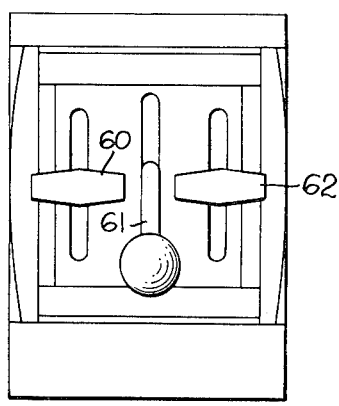
FIG. 12 is a top view of the valve control shown in FIG. 2 and 6.
Figure 13:
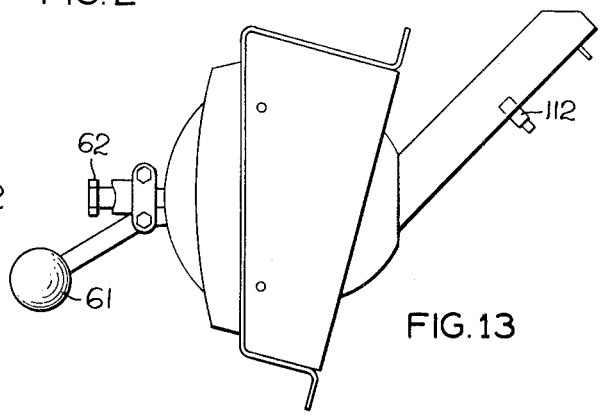
FIG. 13 is a side view of the valve control shown in FIG. 12.

In reference to FIG. 6, the manual controls 60 and 61 for the hydrostatic systems are shown in more detail in FIGS. 2, 12 and 13. The three unit manual control shown in FIGS. 2, 12 and 13 is a type that allows the engine throttle lever 62 and lever 60 to be locked into any attained position (or speed). The traction lever 60 has a neutral position at which no machine motion occurs. Moving the traction lever 60 forward (toward the front of the machine or clockwise in FIG. 13) from neutral causes the machine to move forward. Moving the traction lever 60 rearward away from neutral causes the machine to back up. The rotor hydrostatic control lever 61 moves from neutral (no rotor rotation) downward (counterclockwise with respect to FIG. 13) to maximum rotor speed when at its maximum downward position. Safety precautions require the use of neutral safety switches 112 to assure the machine will not be started when either the traction or rotor levers are out of their respective neutral positions.

In accordance with one aspect of the invention, hydraulic control means of the closed-loop type are provided to enable traction pump 70 to sense the load imposed on hydrostatic pump 71 by loads imposed on rotor 10 and to automatically change or regulate the traverse speed of the machine in response thereto and independently of the setting of the manual control levers 75 and 87. Such means comprise a hydraulic fluid pressure sensing line 114 which is connected between hydrostatic pump 71 and traction pump 70 and to which a dual sensing horse-power limiting control 115 is connected, as shown in FIG. 6. Control 115 enables the machine operator to manually set the rotor control lever 87 and the traction control lever 75 so that an overload would normally be placed on rotor 10. However, the sensing control valve 115 does not allow this condition to actually occur because it overrides manual preset control lever 75 and adjusts (i.e., slows) the forward traverse speed of the machine and thereby reduces the overload condition imposed on the rotor 10 to a safe or acceptable level or condition. This automatic adjustment is accomplished without stalling engine or the rotor drive motors 20.

Figure 9:
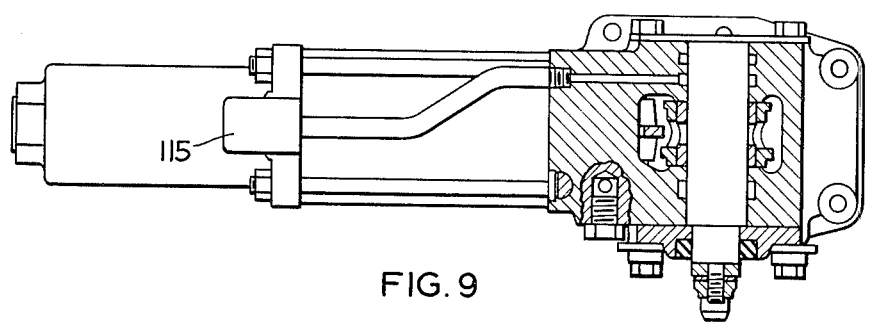
FIG. 9 is a top plan view, partly in section of the valve of FIG. 8.
Figure 8:
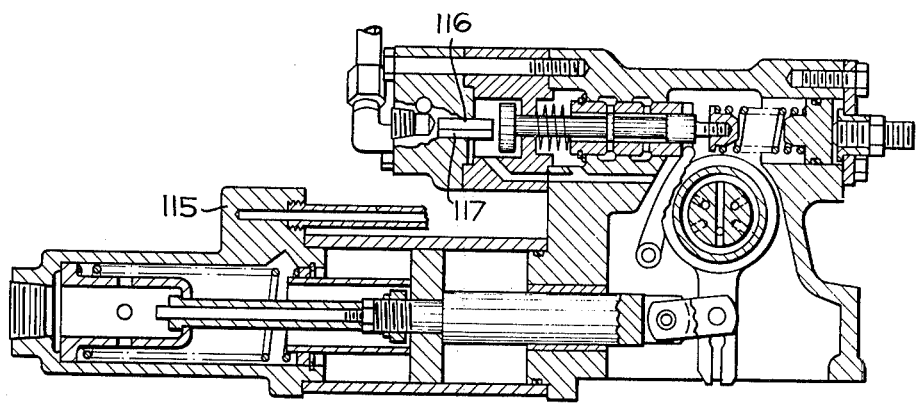
FIG. 8 is a cross section view of the control valve for the traction pump shown in FIG. 6.

More specifically, pump 70 in FIG. 6 is provided with a dual-sensing pin short differential control. The traction pump control 115 in FIG. 6 is shown also in FIGS. 8 and 9 and has two pressure sensing pins 116 and 117, one of which receives a high pressure signal from the hydrostatic rotor drive through line 114. The sense pin is sized so that when a preset limiting pressure is reached by the rotor hydrostatic pump 71, the low pressure servo of traction pump 70 will be overriden and the traction pump cam angle and swash plate angle will be reduced. Effectively this reduces the output flow of the traction pump 70 and thus decreases the forward speed of the vehicle. When the pressure on the sense pin is reduced the low pressure servo of traction pump 70 again returns toward its original position. This effectively increases the speed of the vehicle and is limited by the preset position of the manual control lever 75 in FIG. 6.

A secondary protective means is provided for rotor 10 and comprises high pressure cross-over relief valve 83 that allows pressure surges produced in lines 96 and 97 by the motors 20 when high shock loads are applied to rotor 10 to be relieved.

In accordance with another aspect of the invention, a mechanical-hydraulic means or system is provided to enable the rotor 10 to be set for a predetermined cutting depth (below the soil surface or below the wheel plane of the machine), to enable automatic repositioning of the rotor at that depth, if displaced therefrom by objects in the soil, and to provide a direct visual read-out (preferably in inches) at the operator's console of the rotor depth and any displacement from the predetermined depth.

Figure 7:
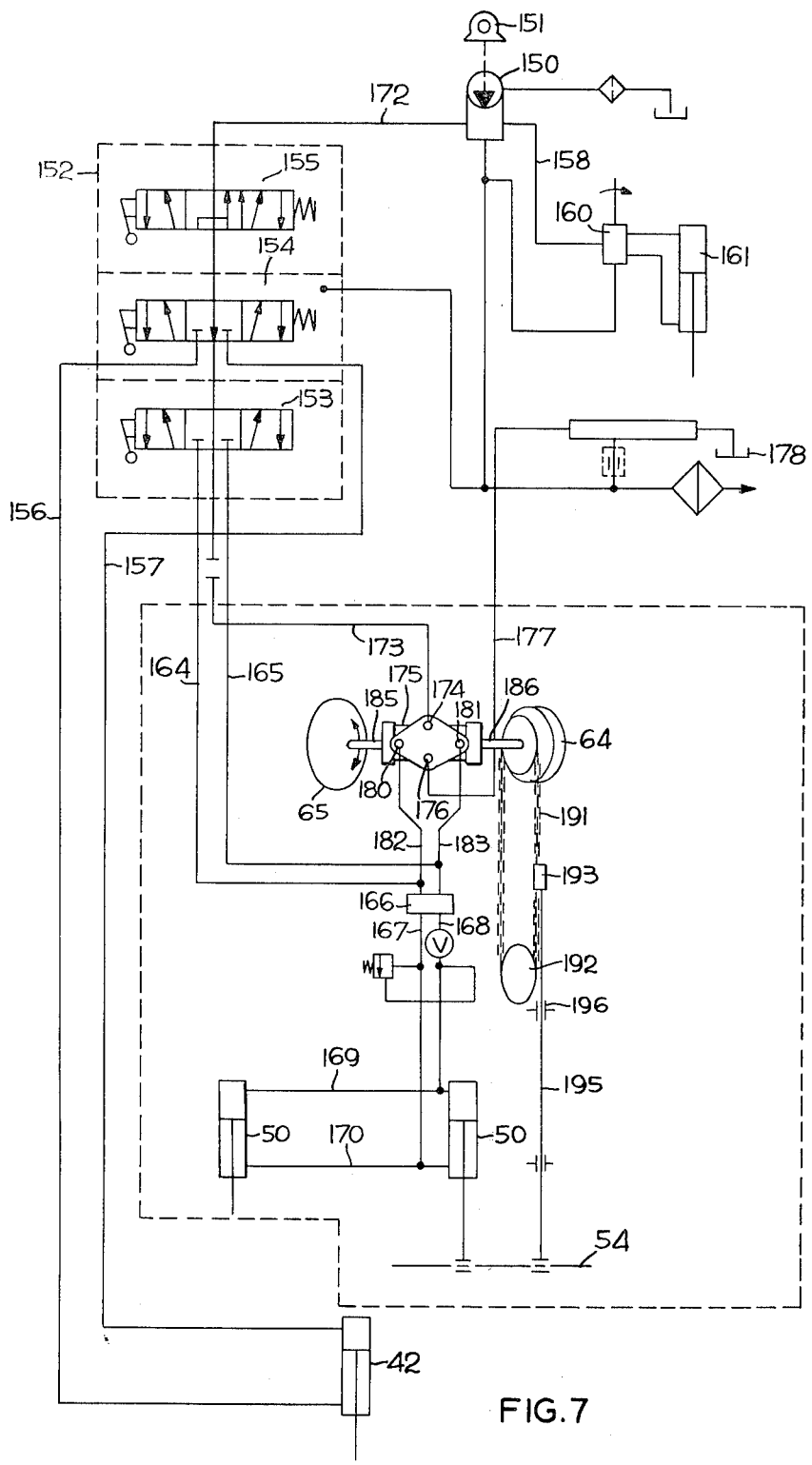
FIG. 7 is a schematic diagram of the hydraulic system for regulating the depth of the rotor of the machine shown in FIG. 1.

This system is shown schematically in FIG. 7 and comprises a hydraulic pump 150 driven by the left hand cam shaft 151 of the engine which supplies operating fluid to a valve assembly 152 which includes a rotor control valve 153, a hood tail gate control valve 154 and a brake valve 155, each of which are manually controlled, independently operable and located at the operator's control console 5 on chassis 1 of the machine. Gate control valve 154 is connected by fluid lines 156 and 157 to gate control cylinder 42 shown in FIGS. 1 and 7. Brake valve 155 is understood to be connected by suitable fluid lines to a brake cylinder (not shown). Pump 150 also supplies fluid through a fluid line 158 to a control valve 160 which operates a hydraulic cylinder 161 for controlling other machine components not directly relevant to the present invention.

Rotor control valve 153 is a three position valve which controls pressurization of the pair of rotor position cylinders or actuators 50, shown in FIGS. 3 and 7, and when in raise or lower position effects raising or lowering, respectively, of rotor 10. Rotor control valve 153 is connected by two fluid lines 164 and 165 to a lock valve 166 and the latter has two fluid lines 167 and 168 which are connected to two fluid supply lines 169 and 170, respectively, which are connected to the lower and raise sides, respectively, of the cylinders 50. Rotor control valve 153 is shown in its neutral position in FIG. 7 wherein it connects fluid supply line 172 from pump 150 to a fluid supply lines 173 which is connected to the input port 174 of a rotary servo valve 175. An output port 176 of valve 175 is connected by a fluid line 177 to a reservoir 178. Servo valve 175 also has cylinder supply ports 180 and 181 which are connected by supply lines 182 and 183, respectively, to the supply lines 164 and 165, respectively.

Rotary servo valve 175 is known type of valve and may be similar to that disclosed in U.S. Pat. No. 3,254,674 to R. F. Leak for "Rotary Servo Valve" issued June 7, 1966. Servo valve 175 has shafts 185 and 186 at each end. When either shaft is restricted from rotating and the other shaft is rotated, oil flows from one of the ports 180 or 181 (depending on which shaft is rotated) and effects raising or lowering movement of the cylinders 50 supplied therefrom. Oil flow continues until both servo shafts 185 and 186 are returned to their normal or neutral positions. When the latter condition occurs, oil flows directly from input port 174 to output port 176 and from thence to reservoir 178.

Figure 10:
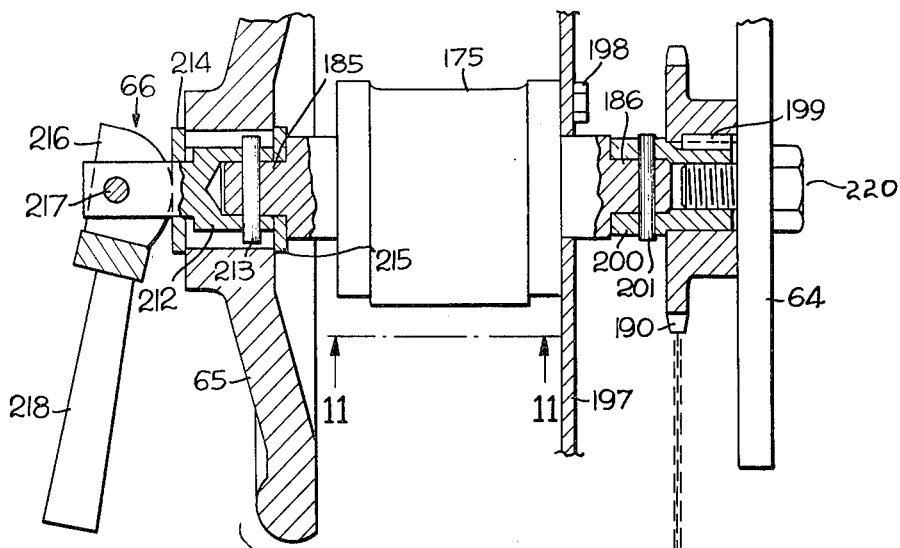
FIG. 10 is an enlarged side view of the rotor position control valve shown in FIGS. 2 and 7.
Figure 11:
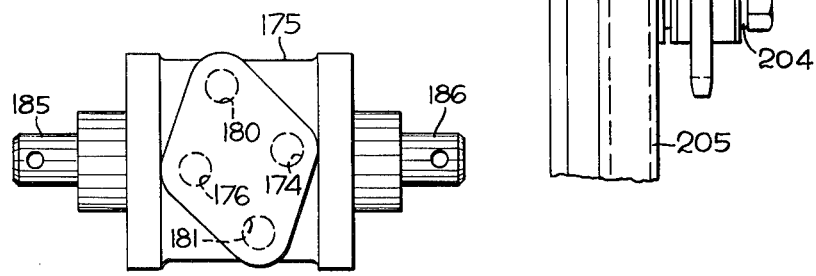
FIG. 11 is a side view taken on line 11—11 of FIG. 10.

As FIGS. 3, 7 and 10 show, shaft 186 of servo valve 175 is provided with a sprocket 190 which is linked by a connecting chain 191 to another sprocket 192. A clevis assembly 193 is connected to chain 191 and a linearly movable feed back cable 195 (enclosed in a cable housing 196) is connected between the clevis assembly and the movable tube 54 in stabilizer unit 6. FIGS. 3 and 10 show that servo valve 175 is rigidly mounted in horizontal position on a plate 197 forming part of console 5 by bolts 198 and that sprocket 190 is secured by a key 199 to a sleeve 200 which, in turn is secured by a roll pin 201 to servo valve shaft 186. A circular indicating disc 64, preferably calibrated in inches, is secured and movable with sprocket 190. Disc 64 extends through a slot 203 in control console 5, as shown in FIG. 2, so as to be visible to the operator. FIG. 10 shows that the other sprocket 192 is rotatably mounted on a shaft 204 which is mounted on a bracket 205 which is adjustably secured by bolts 206 to a portion 207 of the console 5. FIG. 3 shows that feed back cable 195 has one end pivotably connected by a pin 208 to clevis assembly 193 and has its other end pivotably connected by a pin 209 to a bracket 210 on shaft 54 of the rotor lift arms 9. Cable 195 is disposed in a non-movable, flexible cable housing 196. Linear motion originating at arms 9 is fed back to connecting chain 191 by cable 195 and is translated into rotary motion at sprocket 190 to effect rotation of indicating disc 64 to provide a direct readout.

Shaft 185 of servo valve 175 is provided with a manually operable hand wheel 65 which can be locked in a desired position and is located on an exterior side of the operator's control console 5. Rotor 10 is raised or lowered by rotation of hand wheel 65 in the appropriate direction. Hand wheel 65 is provided with cam lock means 66 for locking the wheel in desired positions so that a predetermined depth, within system limits, can be maintained. As FIG. 10 shows, servo shaft 185 is provided with a shaft extension 212 which is secured by a pin 213 which also holds the wheel 65 in place with respect to rotation. Washers 214 and 215 are provided on opposite sides of wheel 65. A double cam member 216 having an operating handle 218 is pivotably mounted by a pin 217 on shaft extension 212. Cam member 216 is shown in engaged position in FIG. 10. When handle 218 is rotated counterclockwise, the cam member frictionally engages and exerts a force on washer 214 thereby holding wheel 65 (and servo shaft 185) in a fixed position with respect to the housing of servo valves 175.

In operation, a rotary input from the feed back system to servo shaft 186 caused by displacement of rotor 10 causes the servo shafts 185 and 186 to be out of phase and hydraulic fluid will be directed to port 180 or 181 to correct for the shafts being out of phase (or out of their neutral position with respect to each other).

Releasing the cam lock lever 216 and turning the hand wheel 65 manually will also place the two shafts 185 and 186 out of phase and hydraulic fluid will be directed to either port 180 or 181, depending on whether it is desirable to raise or lower the position of rotor 10.

Upon attaining any desired position of rotor 10, the hand wheel is released and the position will normally be maintained. However, external forces or internal system leakage may cause rotor 10 to deviate from this position with time and thus the need for the locking lever 216 to assure the attained position is maintained.

Referring to FIG. 10 it can be seen that the indicator disc 64 is held in place by a cap screw 220. When changing calibration, screw 220 is loosened, the disc 64 repositioned as required followed by retightening of the cap screw. This allows the machine to be calibrated to the prevailing job conditions.

RESUME

An improved self-propelled rubber-tired engine powered soil stabilizer machine comprises a chassis 1 on which an engine 4 and operator's console 5 are mounted and to which a soil stabilizer unit 6, including a rotor 10 and a hood 15, is attached. Engine 4 drives a traction pump 70 which supplies hydraulic operating fluid to the hydraulic motors 74 which drive the vehicle's traction wheels 2. The engine 4 also drives a hydrostatic pump 71 which supplies hydraulic operating fluid to a pair of low speed, high torque hydraulic motors 20 which drive the rotor 10 and are mounted directly (and replaceably) at both ends of the rotor exteriorly of hood 15. The speed of the hydraulic motor 74 for the traction wheels 2 and the speed of the hydraulic motors 20 for the rotor 10 are manually controllable independently of each other by controllers 75 and 87, respectively. Preferably, the rotor speed is infinitely variable through at least two operating speed ranges by means of a selector valve 86.

In accordance with one aspect of the invention, hydraulic control means of a closed-loop type and including a sensing and limiting control 115 are provided to enable the traction pump 70 to sense the load imposed on the hydrostatic pump 71 by loads imposed on the rotor 10 and to automatically change or regulate the traverse speed of the machine in response thereto, independently of the setting of the manual control 75 which regulates traction speed. The hydraulic control means further comprises a pressure relief valve 83 to relieve pressure surges resulting from heavy shock loads on the rotor 10.

In accordance with another aspect of the invention mechanical-hydraulic means are provided with enable the rotor 10 to be set for a predetermined cutting depth, which move or reposition the rotor vertically at such depth after any displacement therefrom, and which provide a direct visual read-out on a dial 64 at the operator's console 5 showing any vertical displacement of the rotor. The mechanical-hydraulic means comprise a rotary servo valve 175 for controlling hydraulic fluid flow to hydraulic actuators 50, which move rotor 10 vertically. The rotary servo valve has two independently rotatable valve shafts 185 and 186 and a manually operable adjustable wheel 65 effects rotation of valve shaft 185 to set rotor depth. Mechanically operable adjustable means effects rotation of the other valve shaft 186 in response to vertical movement of rotor 10. These mechanically operable adjustable means comprise a first sprocket wheel 190 on valve shaft 186, a second sprocket wheel 192 spaced from the first sprocket wheel, an endless chain 191 connected between the sprocket wheels, and a cable 195 connected to the chain and to rotor 10 and movable in response to vertical movement of the rotor to effect movement of valve shaft 186 of the servo valve.

I claim:

1. A soil working machine having a chassis on which traction wheels, an engine, and a soil stabilizer unit comprising a vertically movable rotor are mounted, said soil stabilizer unit further comprising a rotor support frame connected to said chassis and on which said rotor is mounted, hydraulic actuator means connected between said chassis and said rotor support frame for vertically moving said rotor, a hydraulic fluid source, a hydraulic pump driven by said engine for supplying fluid from said source to said actuator means, and depth control means for said actuator to locate and maintain said rotor at a predetermined depth, said depth control means comprising a servo valve located on said machine for controlling hydraulic fluid flow from said pump to said hydraulic actuator means, said servo valve having two independently movable valve control shafts, said depth control means further comprising manually operable adjustable means connected to one valve control shaft for controlling said hydraulic actuator means to locate said rotor at a predetermined depth, and further comprising mechanically operable adjustable means connected to the other valve control shaft and to said rotor and responsive to rotor position for maintaining said rotor at said predetermined depth.

2. A machine according to claim 1 wherein at least said other valve control shaft is rotatable, wherein said mechanically operable adjustable means comprises a first sprocket wheel on said other valve control shaft, a second sprocket wheel spaced from said first sprocket wheel and supported for rotation on said machine, an endless chain connected between said sprocket wheels, and a member connected between said chain and said rotor and movable in response to vertical movement of said rotor to effect movement of said chain and said other valve control shaft of said servo valve.

3. A machine according to claim 2 wherein said member is a flexible cable connected to and movable by said frame.

4. A self propelled soil stabilizing machine including a chassis, traction wheels mounted on the chassis, and a soil stabilizer unit operatively connected to the chassis, the stabilizer unit including a vertically movable rotor support frame, a rotor hood supported on the rotor support frame, a rotor mounted within the rotor hood, and actuator means operatively connected between the chassis and rotor support frame for vertically moving the rotor, the improvement comprising depth control means to locate and maintain the rotor at a predetermined depth, the depth control means comprising: a source of power on the soil stabilizing machine connected to operate the depth control means, a servomechanism on the soil stabilizing machine connected to control power flow from the source to the depth control means and having reference neutral position for controlling the actuator and thereby the position of the rotor to locate and maintain the rotor at the predetermined depth, the servomechanism having two independently operable control elements, first manually adjustable means operatively connected to one control element of the servomechanism to select the predetermined depth for the rotor, and second adjustable means operatively connected between the other control element of the servomechanism and the stabilizer unit, the second adjustable means being responsive to a change of the rotor position from the predetermined depth and effecting actuation of the actuator means for placing the servomechanism in its reference neutral position and thereby causing the rotor to be returned to the selected predetermined depth.

5. A machine according to claim 4 wherein said second adjustable means comprises mechanically operable means connected between the other control element and the rotor.

6. A machine according to claim 5 wherein the other control element is rotatable, wherein the mechanically operable second adjustable means comprises a first sprocket wheel on the other rotatable control element, a second sprocket wheel spaced from the first sprocket wheel and supported for rotation on said machine, an endless chain connected between both sprocket wheels, and a member connected between the chain and the rotor and movable in response to vertical movement of the rotor to effect movement of the chain and the other rotatable control element of the servomechanism.

7. A machine according to claim 6 wherein the member is a flexible cable connected to and movable by the rotor support frame.

* * * * *